(12) United States Patent
Chen

(10) Patent No.: US 7,704,030 B2
(45) Date of Patent: Apr. 27, 2010

(54) SCREW FOR USE IN NONMETAL OBJECTS

(75) Inventor: Chi-Hsiang Chen, Kaohsiung Hsien (TW)

(73) Assignee: Zyh Yin Enterprise Co., Ltd., Kaohsiung Hsien (TW)

( * ) Notice: Subject to any disclaimer, the term of this patent is extended or adjusted under 35 U.S.C. 154(b) by 419 days.

(21) Appl. No.: 11/924,555

(22) Filed: Oct. 25, 2007

(65) Prior Publication Data

US 2009/0110515 A1 Apr. 30, 2009

(51) Int. Cl.
*F16B 25/00* (2006.01)
(52) U.S. Cl. .................................. 411/411; 411/386
(58) Field of Classification Search .............. 411/386, 411/387.1, 387.2, 411, 412, 413, 424, 311
See application file for complete search history.

(56) References Cited

U.S. PATENT DOCUMENTS

| 2,263,137 | A | * | 11/1941 | Oestereicher | 411/413 |
| 2,484,645 | A | * | 10/1949 | Baumle | 411/311 |
| 4,652,194 | A | * | 3/1987 | Tajima et al. | 411/417 |
| 5,895,187 | A | * | 4/1999 | Kuo-Tai | 411/386 |
| 6,056,491 | A | * | 5/2000 | Hsu | 411/418 |
| 6,328,516 | B1 | * | 12/2001 | Hettich | 411/387.2 |
| 6,595,733 | B1 | * | 7/2003 | Willert | 411/311 |
| 6,789,991 | B2 | * | 9/2004 | Hsu | 411/387.6 |
| 2008/0219801 | A1 | * | 9/2008 | Toenjes | 411/413 |
| 2009/0110512 | A1 | * | 4/2009 | Chen | 411/386 |
| 2009/0169334 | A1 | * | 7/2009 | Su | 411/412 |

* cited by examiner

*Primary Examiner*—Flemming Saether
(74) *Attorney, Agent, or Firm*—Banger Shia

(57) ABSTRACT

The present invention pertains to a screw for use in nonmetal objects comprising a plurality of cut-aiding portions formed by the longer and shorter cutting surfaces inclined toward opposite directions. Further, a cutting edge formed by the junction of any two adjacent cutting surfaces presents in a fastening direction of the screw. Thus, the cutting edge assists the threads to thoroughly severe and to shatter the fibers and debris of the objects, which can also be accommodated into the cut-aiding portions. Also, the ridge of the longer cutting surface aids in cutting fibers and further guides the debris out. In this manner, the present invention facilitates to enhance cutting capability for obtaining less screwing resistance, to prevent the destruction of the object and to increase the screwing speed.

4 Claims, 7 Drawing Sheets

SCREW FOR USE IN NONMETAL OBJECTS

BACKGROUND OF THE INVENTION

1. Field of the Invention

The present invention relates to a screw, in particular a screw for use in nonmetal objects.

2. Description of the Related Art

Referring to FIG. 1, a conventional screw 1 comprises a screw head 10, a shank 11 extending from the head 10, a drilling portion 12 disposed at the distal end of the shank 11, and a plurality of threads 13 disposed on the shank 11; wherein a plurality of slots 14 are disposed on the surface of the shank 11, which results of the slight concavities in cross section PP P of FIG. 1 separately presented around the periphery of the shank 11, as shown in FIG. 2. In operation, the screw 1 is rotated into the wood object 2 by exerting the slots 14 to cut the fibers and accommodate the debris.

Generally, in regard to the resilience of the wood fibers and the expeditious rotation, the fibers would not be thoroughly received into the slots 14 with smaller spaces, thus rendering part of fibers to be severed into debris and the remaining part to be unsevered. Furthermore, due to the configuration of the slots 14, the debris is hardly guided out of the object 2 and is continuously accumulated therein; simultaneously, the unsevered and unbroken fibers are twisted round the shank 11. In this manner, the aforementioned debris and the fibers facilely make a larger screwing resistance and further cause the burden of the operators and the destruction of the object 2 while rotating the screw 1, thus affecting the screwing efficiency.

SUMMARY OF THE INVENTION

Therefore, the objects of the present invention are to provide a screw which is conducive to enhance cutting capability, reduce the screwing resistance for a higher screwing speed and prevent the destruction of the object.

The screw relating to the present invention comprises a screw head, a shank, a drilling portion and a plurality of threads; wherein a plurality of cut-aiding portions are located between any of two threads, and each of which consists of a longer cutting surface and a shorter cutting surface positioned toward opposite directions. A cutting edge formed by two adjacent cutting surfaces in any of the two adjacent cut-aiding portions presents in a fastening direction. Further, a ridge defined by the raked faces with different slopes on the longer cutting surface also extends to the shorter cutting surface. According to the aforementioned configurations, the cutting edge assists the threads to thoroughly sever and shatter the fibers and the debris, which can be received into the cut-aiding portions with larger spaces, and further accompanying with the assistance of the ridge to cut and smoothly guide the debris out, thereby decreasing the screwing resistance and improving the problem of the destruction to the object.

The advantages of the present invention over the known prior art will become more apparent to those of ordinary skilled in the art upon reading the following descriptions in junction with the accompanying drawings.

DETAILED DESCRIPTION OF THE PREFERRED EMBODIMENTS

Figure 1:
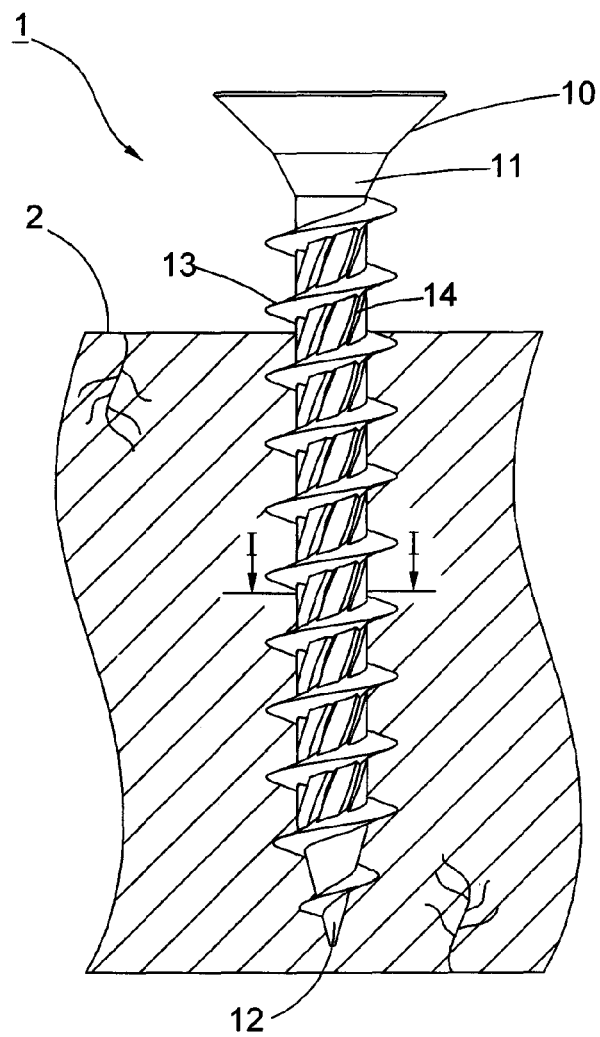
FIG. 1 is a schematic view showing a conventional screw to be screwed into the object.
Figure 2:
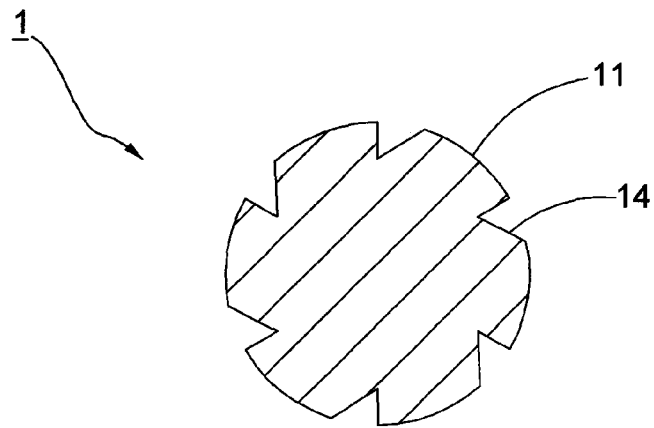
FIG. 2 is a cross-sectional view showing the portion PP P of the conventional screw.

Before the present invention is described in greater detail, it should be noted that the like elements are denoted by the same reference numerals throughout the disclosure.

Figure 3:
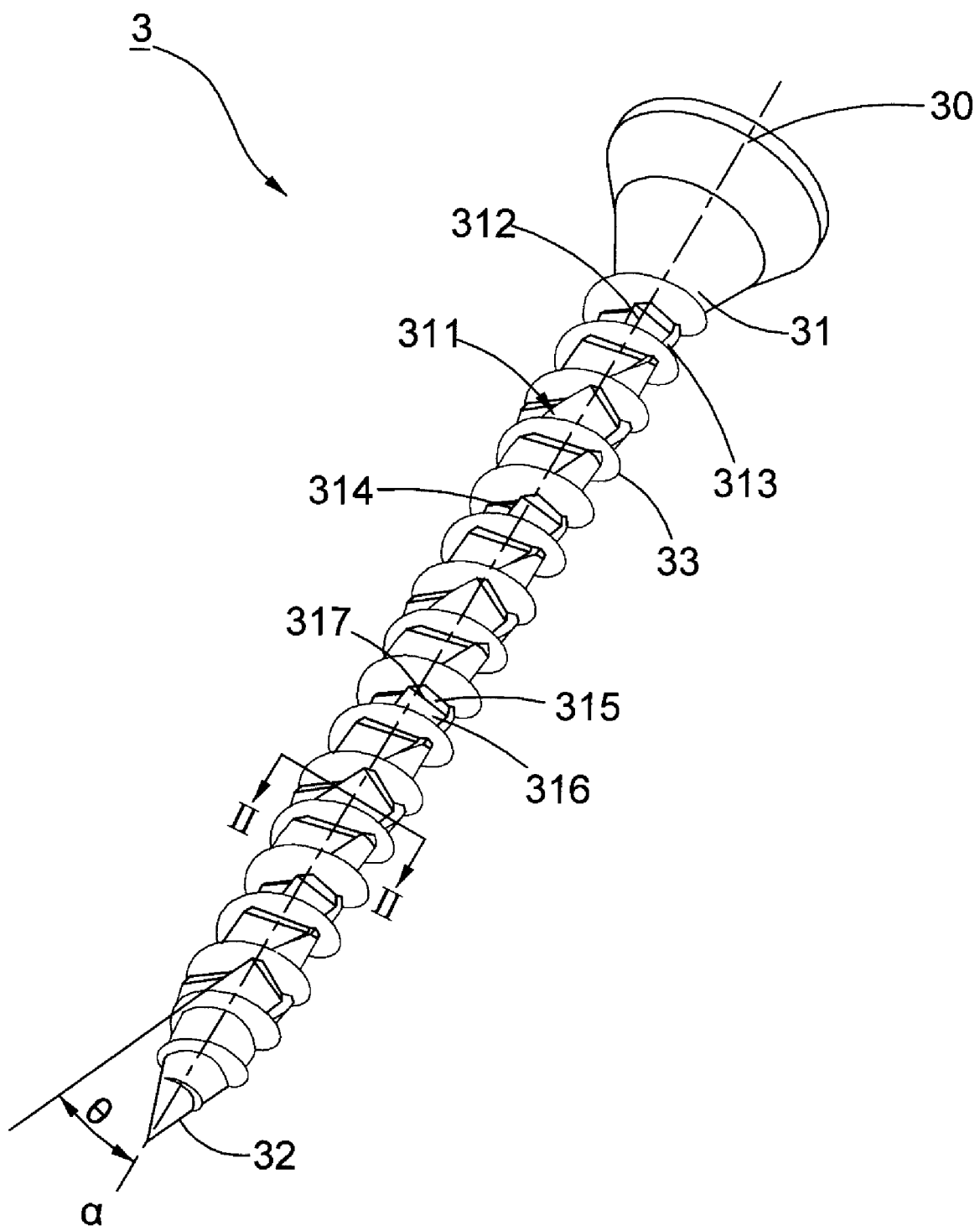
FIG. 3 is a perspective view of a first preferred embodiment of the present invention.
Figure 4:
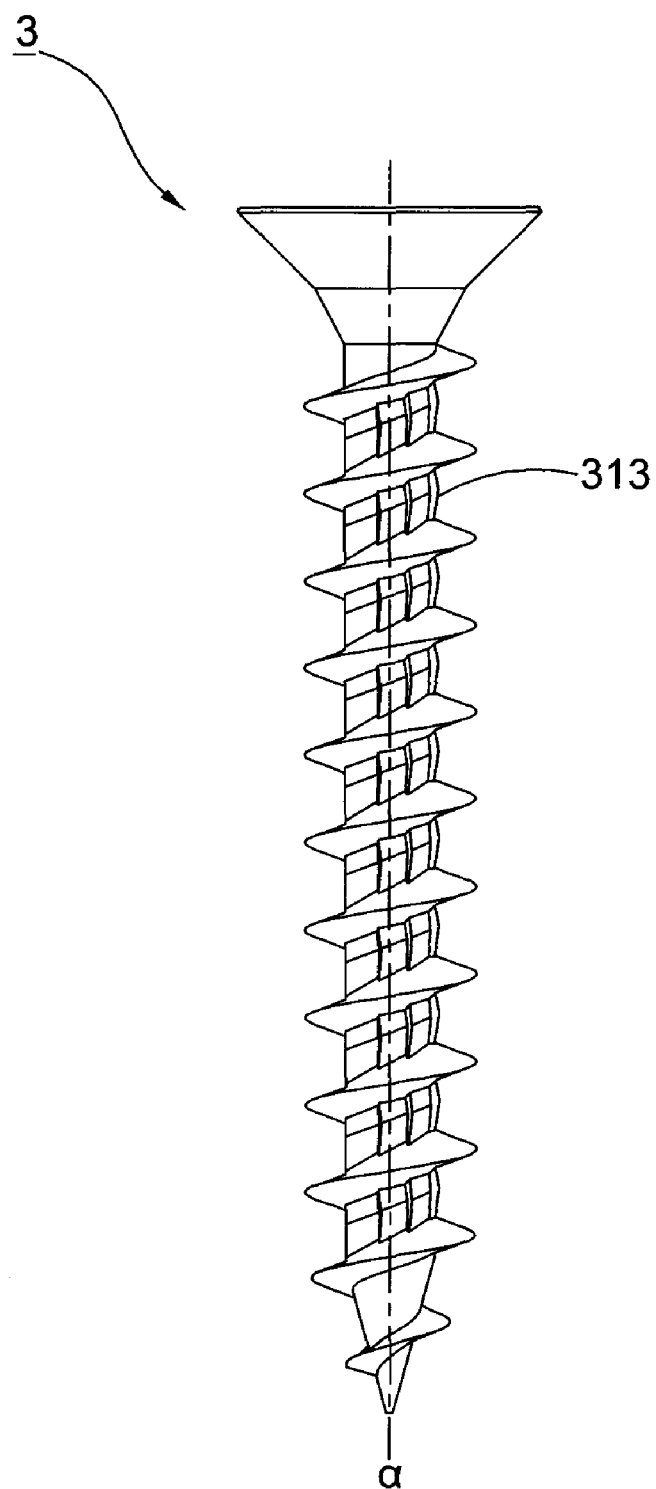
FIG. 4 is a schematic view of a second preferred embodiment of the present invention.
Figure 5:
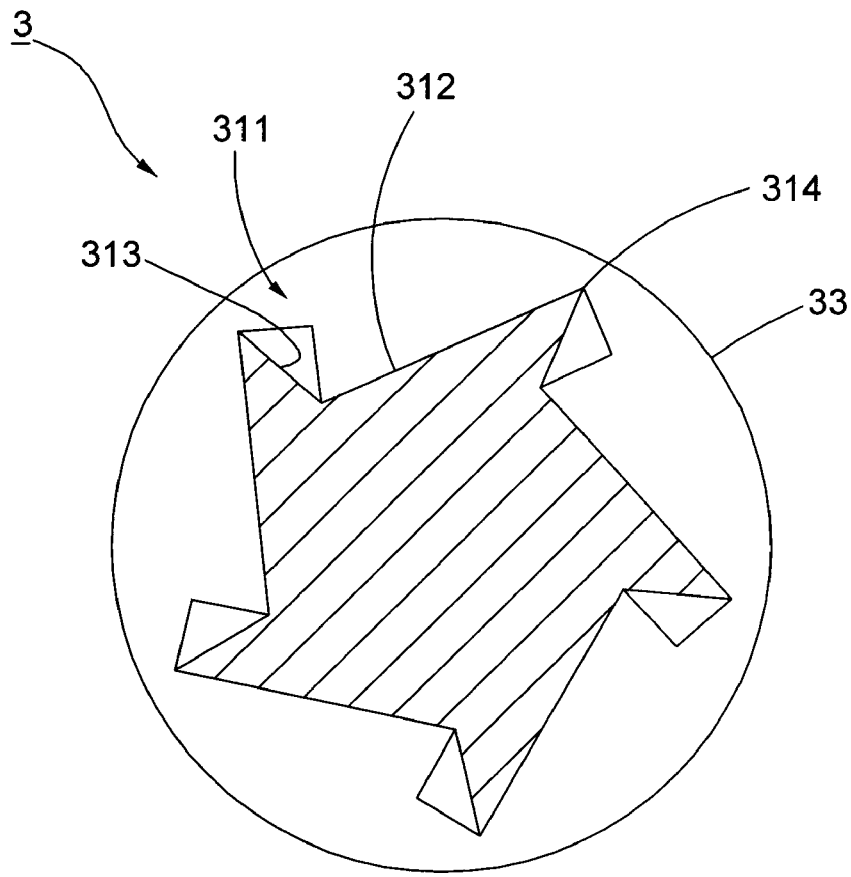
FIG. 5 is a cross-sectional view showing the portion PP P of FIG. 3.

Referring to FIG. 3, a screw 3 of a first preferred embodiment comprises a screw head 30, a shank 31 longitudinally extending from the screw head 30 along a shank axis PP P, a drilling portion 32 disposed on the distal end of the shank 31, opposite to the screw head 30, and a plurality of threads 33 disposed on the shank 31; wherein a plurality of cut-aiding portions 311 disposed on the shank 31 and located between any of the two threads 33. The cut-aiding portions 311 are adjacent to each other. Each of the cut-aiding portions 311 consists of a longer cutting surface 312 and a shorter cutting surface 313 joined thereto, which are positioned toward opposite directions. The shorter cutting surface 313 can be parallel to (shown in FIG. 4) or inclined to (shown in FIG. 3) the shank axis P, and it is adopted to be inclined with respect to the shank axis P by an angle P in FIG. 3 or be slanted as a triangular shape shown in FIG. 5 presenting the cross section P of FIG. 3. The angle P in particular permits 8 to 20 degrees applied to the preferred embodiments of the present invention. Still referring to FIGS. 3 and 5, a cutting edge 314 is defined at an intersect of the shorter cutting surface 313 and the longer cutting surface 312, which are respectively located in any of the two adjacent cut-aiding portions 311, whereby the cutting edges 314 present in a fastening direction of the screw 3, for instance of a tendency toward a clockwise direction.

Figure 6:
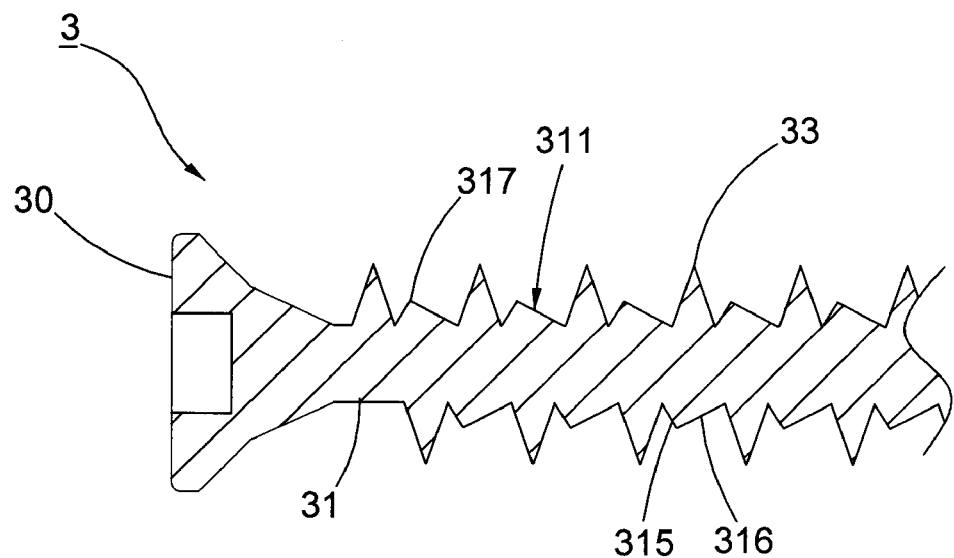
FIG. 6 is a transverse sectional view showing the shank of FIG. 3.

Further referring to FIGS. 3 and 6, the longer cutting surface 312 comprises a first raked face 315 and a second raked face 316 with different slopes disposed thereon, thereby forming a ridge 317 where the first raked face 315 and the second raked face 316 meet; the ridge 317 transversely extends to the shorter cutting surface 313 of the cut-aiding portion 311.

Figure 7:
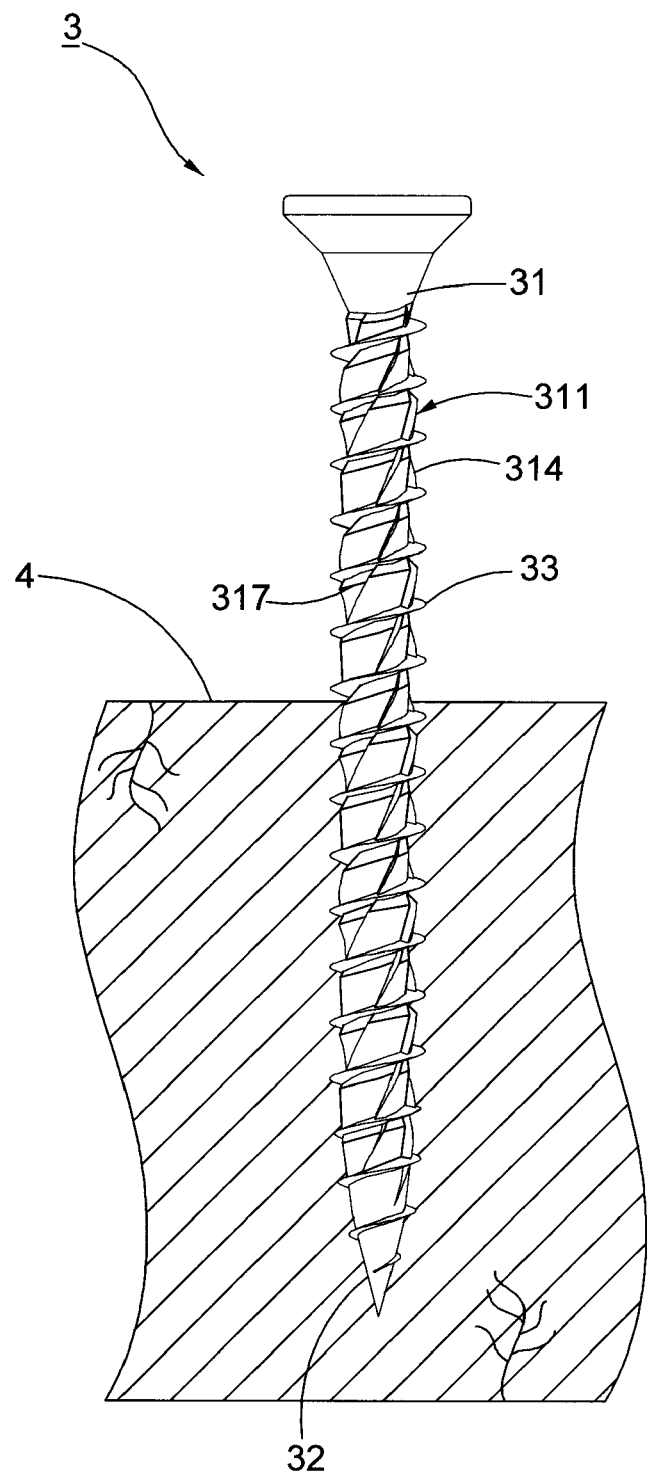
FIG. 7 is a schematic view showing the first embodiment of FIG. 3 to be screwed into the object.

Referring to FIG. 7, in manipulation, the screw 3 is initially drilled into a object 4 (for instance of a wood object) by the drilling portion 32 and the threads 33; further, the cutting edge 314 and the ridge 317 of the cut-aiding portion 311 assist to sequentially sever and shatter the fibers of the object 4 into smaller debris, so as to lower the screwing resistance and preventing the unsevered fibers from being twisted round the shank 31. Simultaneously, the debris thus can be received into the cut-aiding portions 311 between any of two threads 33, and the ridge 317 aids in smoothly guiding the debris out of the surface of the object 4, so as to prevent the fibers and debris from being constantly accumulated in the object 4. As a result, the present invention effectively enhances the cutting capability for a lower screwing resistance and reduces the destruction of the object, thus increasing the screwing efficiency.

Figure 8:
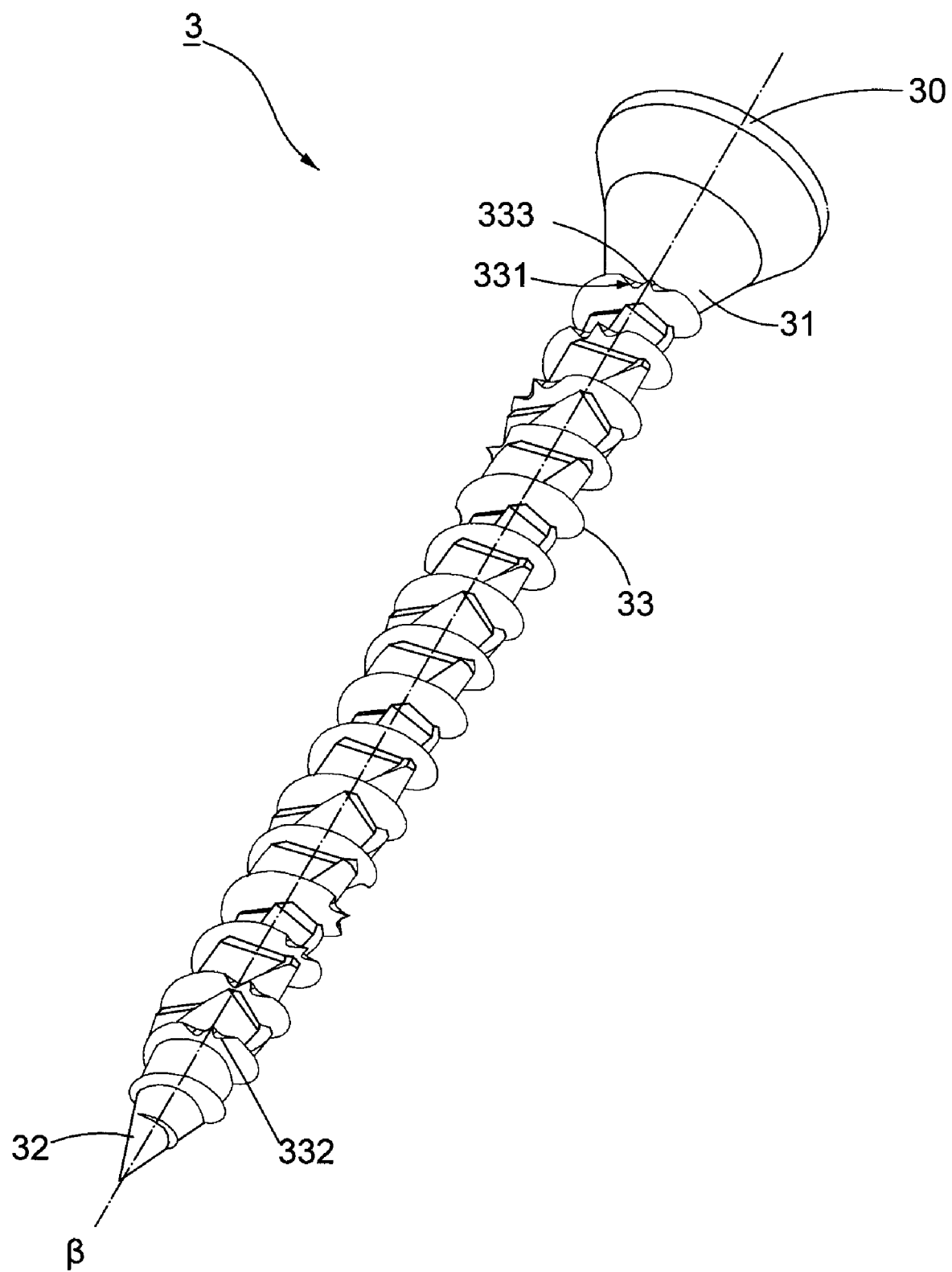
FIG. 8 is a perspective view of a third preferred embodiment of the present invention.

Referring to FIG. 8, a screw 3 of a third preferred embodiment comprises the similar configurations as the first preferred embodiment. Particularly, a notch 331 is disposed on an outer edge of each of the threads 33 and can be formed in V-shaped, U-shaped, semicircle-shaped, etc. Two V-shaped notches 331 are especially applied to this preferred embodiment of the present invention. Further, the notches 331 on the threads 33 are sequentially connected to be arranged as a state of a single helix around the shank 31, started from an initial notch 332 located adjacent to the drilling portion 32 and terminated at a final notch 333 located adjacent to the screw head 30. The initial notch 332 and the final notch 333 are disposed at relative positions, whereby the initial notch 332 is exactly aligned with the final notch 333 by an imaginary line P.

Figure 9:
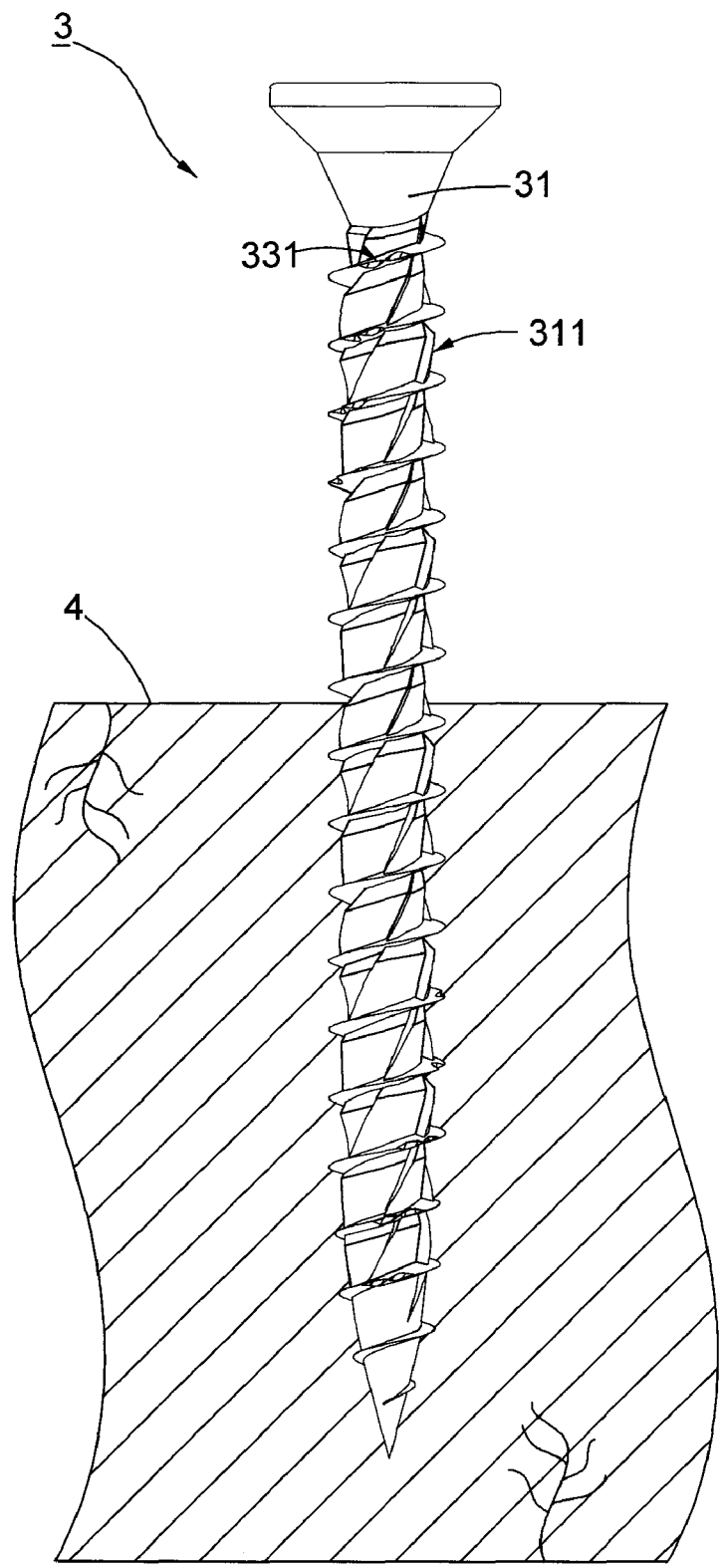
FIG. 9 is a schematic view showing the third embodiment of FIG. 6 to be screwed into the object.

Further referring to FIG. 9, the screw 3 thoroughly and sequentially severs and shatters the fibers into smaller debris and guide the debris out of the surface of the object 4 through the cut-aiding portions 311 and the notches 331, so as to effectively reduce the screwing resistance for a higher screw speed and prevent from damaging the object 4.

To sum up, the present invention takes advantages of the cut-aiding portions on the shank having the longer and shorter cutting surfaces, thereby defining a cutting edge for cooperating with threads to sever and shatter the fibers and a ridge for assisting to cut and smoothly guide the debris out of the surface of the object. As a result, the present invention would be conducive to reduce the screwing resistance and avoid the destruction of the object by improving the problem of the unsevered fibers and the unbroken debris being twisted round the shank and continuously accumulated in the object.

While we have shown and described the embodiment in accordance with the present invention, it should be clear to those skilled in the art that further embodiments may be made without departing from the scope of the present invention.

I claim:

1. A screw for use in nonmetal objects comprising:
a screw head;
a shank longitudinally extending from said screw head along a shank axis;
a drilling portion disposed on a distal end of said shank, opposite to said screw head; and
a plurality of threads disposed on said shank;
wherein a plurality of cut-aiding portions being disposed on said shank and located between any two of said threads, and said cut-aiding portions being adjacent to each other; each of said cut-aiding portions consisting of a longer cutting surface and a shorter cutting surface joined thereto; said longer cutting surface and said shorter cutting surface being positioned toward opposite directions; a cutting edge being formed at an intersect of said shorter cutting surface and said longer cutting surface, whereby said shorter cutting surface and said cutting edge being presented in a fastening direction of said screw; said longer cutting surface comprising a first raked face and a second raked face with different slopes disposed thereon, thus forming a ridge where said first raked face and said second raked face meet; said ridge transversely extending to said shorter cutting surface of said cut-aiding portion.

2. The screw as claimed in claim 1, wherein each of said threads has a notch disposed on an outer edge thereof; said notches on said threads are sequentially connected for being arranged as a state of a single helix around said shank, started from an initial notch located adjacent to said drilling portion and terminated at a final notch located adjacent to said screw head; said initial notch and said final notch are disposed at relative positions, so that said initial notch is exactly aligned with said final notch by an imaginary line.

3. The screw as claimed in claim 1, wherein said shorter cutting surface is parallel to said shank axis.

4. The screw as claimed in claim 1, wherein said shorter cutting surface is inclined with respect to said shank axis by an angle.

* * * * *